Patented July 2, 1940

2,206,167

UNITED STATES PATENT OFFICE 2,206,167

PROCESS FOR MANUFACTURING FATTY ESTERS

August Edeler, Cincinnati, and Albert S. Richardson, Village of Wyoming, Ohio, assignors to The Procter & Gamble Company, Cincinnati, Ohio, a corporation of Ohio No Drawing. Application August 22, 1932, Serial No. 629,885

12 Claims. (Cl. 260—411)

Our invention relates to the manufacture of fatty esters containing combined polyhydric alcohol in amount sufficient to have a substantial proportion of the alcoholic hydroxyl groups unesterified. Our invention is especially adapted for the conversion of triglyceride fatty esters (which constitute the major part of most natural fats) to monoglyceride and diglyceride, and is applicable also to the reaction of other polyhydric alcohols with fatty esters, including those which contain alcohols other than glycerin in combination with fatty acids, such as sperm oil and spermaceti.

It is already known that glycerin reacts slowly with fats (consisting predominantly of triglycerides) at temperatures well above 200° C., with formation of diglyceride and probably some monoglyceride. Various powdered solids, e. g., kieselguhr or fuller's earth, have been proposed as catalysts for this reaction, but these substances at best effect a slight increase in reaction rate, temperatures above 200° C. still being required for the reaction. For convenience and economy, and for safeguarding the quality of monoglyceride and diglyceride, more rapid reaction rates and lower reaction temperatures are desirable. This is particularly true where a product high in monoglyceride is wanted.

The object of our invention is to provide an improved process for carrying out the reaction of glycerin and also other polyhydric alcohols with fatty esters. Our process has the advantage of great speed of reaction in the higher range of temperatures heretofore usually employed for combining glycerin with fatty esters, and also the advantage of affording a convenient and economical means for carrying out this and similar reactions at lower temperatures, for example, at temperatures in the range 170° C. to 205° C.

The essential feature of our process is the use of a catalyst consisting of metal salt of carboxylic acid, such as ordinary soap, or alternatively the use of free alkali or other compound capable of forming soap by reaction with fatty esters.

The valence of a metal is a rough index of the catalytic value of its soap as a catalyst for use in our process. The soaps of the monovalent alkali metals are the best catalysts, sodium soaps being ordinarily preferred on account of cost. Soaps of divalent metals are less active but may be used, for example, zinc or calcium soaps. Soaps of trivalent metals, such as aluminum soaps, have little or no value as catalysts for use in our process.

The conditions for reaction may vary widely; for the sake of clarity in the disclosure of our invention, a preferred range of conditions and several examples are given herein, but these should not be construed as imposing specific limits on our invention.

Excellent results are obtained at temperatures in the range of 170° C. to 205° C. Higher temperatures may be used but are unnecessary. For satisfactory operation at about 150° C. or lower, reference should be made to special improvements described in our copending application No. 629,886, filed August 22, 1932.

For making products such as monoglycerides, containing a maximum of combined polyhydric alcohol, we use as catalyst preferably 1% to 5% sodium soap based on the total fatty ester, or an equivalent amount of caustic alkali, but higher amounts of the catalyst give even faster reaction, and some advantage can be realized by use of even less than 1% soap or equivalent alkali. When the polyhydric alcohol to be combined with fatty ester is less than the maximum, the amount of catalyst used may be decreased in about the same proportion.

Alkaline salts, such as trisodium phosphate or sodium carbonate, may be used with good results, although these alkaline salts require somewhat longer reaction time than equivalent amounts of soap or caustic alkali. Likewise other alkali metal compounds capable of reacting with fatty materials to form soap may be used as catalyst, for example, sodium bicarbonate.

Sodium salts of carboxylic acids other than the higher fatty acids may be used, for instance, sodium acetate.

It is desirable but not absolutely essential that the materials used in our process be well dried in advance. Agitation of some kind is practically essential in our process on account of the limited miscibility of polyhydric alcohols and fatty esters.

Our invention is particularly applicable to reaction of fatty esters with glycerin and ethylene glycol, other polyhydric alcohols being at the present time less available commercially.

*Example 1.*—100 parts by weight of coconut oil, an equal weight of C. P. glycerin, and 2 parts by weight of commercially pure sodium soap were mechanically agitated at 200° C. for two hours. After withdrawing the residual layer of glycerin and washing with water to remove most of the dissolved glycerin from the fatty layer, the latter had a saponification value of approximately 197, almost the theoretical value for monoglyceride of coconut oil fatty acids.

*Example 2.*—100 parts of completely hydrogenated cottonseed oil, 22.4 parts commercial high gravity glycerin, and 5 parts dry commercial sodium soap were mechanically agitated and heated rapidly to 200° C. The mixture became homogeneous 12 minutes after reaching 200° C., indicating practically complete reaction to form predominantly monostearin.

*Example 3.*—100 parts of completely hydrogenated cottonseed oil and 22.4 parts anhydrous glycerin containing in solution 0.78 part sodium hydroxide were mechanically agitated and heated rapidly to 200° C. The mixture became homogeneous 3 minutes after reaching 200° C.

*Example 4.*—100 parts cottonseed oil, 72 parts C. P. glycerin and 3 parts commercial sodium soap were mechanically agitated for three hours at 175° C. and the reaction product allowed to separate into an upper fatty layer and a lower layer containing most of the excess of glycerin used. The saponification value of the fat, which was 194 before reaction, was found to have dropped to 152 (the latter figure being uncorrected for dissolved soap and glycerin and hence somewhat lower than the theoretical value for monoglyceride).

The quantity of glycerin chemically combined with fatty esters in our process may be controlled so as to vary from traces to approximately the full amount required to form the monoglyceride of all the fatty acid contained in the original fatty ester used, for instance, in the case of a fat of 195 saponification value, a maximum of about 21 parts pure glycerin for each 100 parts of original fat.

Among other uses, the reaction products of our process may serve as emulsifying agents when added to mixtures of water with fatty or mineral oils, for instance, for the production of cosmetics.

Having thus described our invention, what we claim as new and desire to secure by Letters Patent are:

1. The process of manufacturing fatty esters containing unesterified hydroxyl groups which comprises mixing glycerin and a fatty ester of the type found in fats and fatty oils together with a catalyst consisting of soap of a metal of valence not greater than 2, the amount of said soap being smaller than the amount of glycerin, and maintaining the mixture at not lower than about 150° C. and at a temperature less than the boiling point of glycerin until reaction occurs between said fatty ester and glycerin.

2. The process of increasing the proportion of esterified glycerin in a fat which comprises agitating the molten fat at a temperature above 150° C. and less than the boiling point of glycerin with glycerin and a smaller quantity of soap selected from the group consisting of sodium and potassium soaps, thereby effecting reaction between the glycerin and the triglyceride of the fat.

3. The process of manufacturing fatty esters containing unesterified hydroxyl groups which comprises mixing at about 150° C. to 205° C. glycerin and a fatty ester of the type found in fats and fatty oils together with a catalyst consisting of soap of a metal of valence not greater than two, thereby effecting reaction between said fatty ester and the glycerin.

4. The process of increasing the proportion of esterified glycerin in a fat which comprises agitating the molten fat at about 150° to 205° C. with glycerin and a small quantity of soap of the class including soaps of sodium and potassium, thereby effecting reaction between the glycerin and the triglyceride of the fat.

5. The process of increasing the proportion of esterified glycerin in a fat which comprises agitating the molten fat at about 150° to 205° C. with glycerin and soap of the class including soaps of sodium and potassium, the quantity of soap being not more than about 5% of the weight of original fat, thereby effecting reaction between the glycerin and the triglyceride of the fat.

6. The process of forming monoglycerides and diglycerides, comprising reacting the triglyceride of fat with glycerin at a temperature between about 150° C. and about 205° C., and concurrently saponifying not more than 5% of said fat with an inorganic compound of an alkali metal capable of affecting such saponification, thereby forming a catalyst for the reaction.

7. The process of manufacturing fatty esters containing unesterified hydroxyl groups which comprises mixing at about 150° C. to 205° C. glycerin and a fatty ester of the type found in fats and fatty oils together with a catalyst consisting of soap of a metal of valence not greater than two, thereby effecting reaction between said fatty ester and the glycerin.

8. The process of forming monoglycerides and diglycerides which comprises treating a fat with an inorganic compound of an alkali metal capable of saponifying the fat, the amount of the said compound being just sufficient to saponify not more than 5% of the said fat, and agitating the partially saponified mixture with glycerin at a temperature not less than 150° C. and less than the boiling point of glycerin, thereby converting a substantial proportion of the triglyceride of the fat to monoglyceride and diglyceride.

9. The process claimed in claim 1 in which the catalyst is a soap of a metal selected from the group consisting of calcium, zinc and the alkali metals.

10. The process claimed in claim 2 in which the soap catalyst is formed by partial saponification of the original fat.

11. The process claimed in claim 3 in which the soap catalyst is formed by saponification of a small proportion of the original fatty ester with a compound selected from the group consisting of the hydroxides and the carbonates of sodium and potassium.

12. The process of manufacturing fatty esters containing unesterified hydroxyl groups which comprises mixing glycerin and a fatty ester of the type found in fats and fatty oils together with a small amount of an alkali metal salt having an alkaline reaction acting as a catalyst, the amount of the catalyst being smaller than the amount of glycerin, and maintaining the mixture at not lower than about 150° C. and at a temperature less than the boiling point of glycerin until reaction occurs between said fatty ester and glycerin.

AUGUST EDELER.
ALBERT S. RICHARDSON.